United States Patent
Du et al.

(10) Patent No.: US 8,450,607 B2
(45) Date of Patent: *May 28, 2013

(54) ELECTRONIC DEVICE HOUSING

(75) Inventors: Qi-Jian Du, Shenzhen (CN);
Chwan-Hwa Chiang, Taipei Hsien (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 303 days.

This patent is subject to a terminal disclaimer.

(21) Appl. No.: 12/949,947

(22) Filed: Nov. 19, 2010

(65) Prior Publication Data
US 2011/0155409 A1  Jun. 30, 2011

(30) Foreign Application Priority Data
Dec. 29, 2009  (CN) .......................... 2009 1 0312540

(51) Int. Cl.
*H02G 3/08* (2006.01)
*B32B 9/00* (2006.01)

(52) U.S. Cl.
USPC ............ 174/50; 174/520; 428/469; 428/472; 428/701; 428/702

(58) Field of Classification Search
USPC .................. 174/50, 17 R, 520; 428/469, 472, 428/701, 702, 699, 213, 336, 34.4
See application file for complete search history.

(56) References Cited

U.S. PATENT DOCUMENTS

| | | | | |
|---|---|---|---|---|
| 5,676,812 | A | * | 10/1997 | Kadokura ..................... 174/350 |
| 7,862,910 | B2 | * | 1/2011 | Krisko et al. ................. 428/702 |
| 8,097,344 | B2 | * | 1/2012 | Chiang et al. ................. 428/469 |

\* cited by examiner

*Primary Examiner* — Angel R Estrada
(74) *Attorney, Agent, or Firm* — Altis Law Group, Inc.

(57) ABSTRACT

An electronic device housing is provided. The electronic device housing includes a substrate, a metallic-appearing coating formed on the substrate, and a top coating formed on the metallic-appearing coating. The top coating contains nano-titanium dioxide powder and fluorocarbon resin. The electronic device housing has self-cleaning and anti-fingerprint properties.

18 Claims, 1 Drawing Sheet

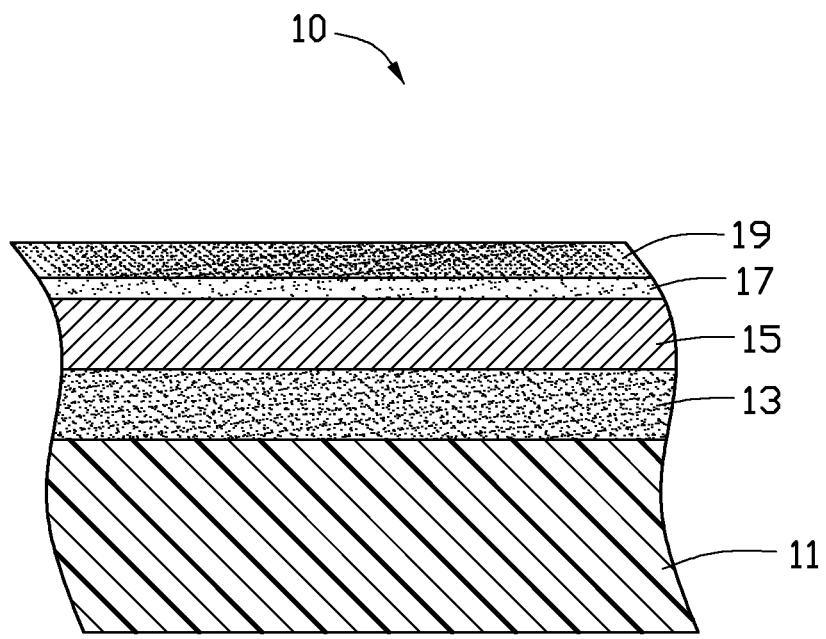

ELECTRONIC DEVICE HOUSING

CROSS-REFERENCE TO RELATED APPLICATIONS

This application is one of the three related co-pending U.S. patent applications listed below. All listed applications have the same assignee. The disclosure of each of the listed applications is incorporated by reference into all the other listed applications.

| | Title | Inventors |
|---|---|---|
| 12/949,934 | ELECTRONIC DEVICE HOUSING AND METHOD FOR MAKING THE SAME | QI-JIAN DU et al. |
| 12/949,942 | ELECTRONIC DEVICE HOUSING | QI-JIAN DU et al. |
| 12/949,947 | ELECTRONIC DEVICE HOUSING | QI-JIAN DU et al. |

BACKGROUND

1. Technical Field

The present disclosure relates to electronic device housings, particularly to an electronic device housing having self-cleaning and anti-fingerprint properties.

2. Description of Related Art

Decorative metallic-appearing coatings are often formed on housings of electronic devices. The metallic-appearing coatings are typically formed by vacuum deposition to provide a metallic-appearance. The metallic-appearing coatings formed by vacuum deposition can be nonconductive to not block electromagnetic waves. However, the metallic-appearing coatings are not self-cleaning, and cannot repel dust and sweat that collects on the electronic device housings, nor can they resist fingerprint thereon.

Therefore, there is room for improvement within the art.

BRIEF DESCRIPTION OF THE FIGURE

Many aspects of the electronic device housing can be better understood with reference to the following FIGURE. The components in the FIGURE are not necessarily drawn to scale, the emphasis instead being placed upon clearly illustrating the principles of the electronic device housing.

The FIGURE is a cross-section of an embodiment of an electronic device housing.

DETAILED DESCRIPTION

The FIGURE shows an electronic device housing 10 according to an embodiment. The electronic device housing 10 includes a substrate 11, and a base paint coating 13, a metallic-appearing coating 15, an intermediate paint coating 17, and a top coating 19 formed on a surface of the substrate 11 in that order. The electronic device housing 10 may be a housing of a mobile phone, PDA, note book computer, MP3, MP4, GPS navigator, or digital camera.

The substrate 11 may be formed by molding one or more of polycarbonate (PC), polyethylene (PE), polymethyl methacrylate (PMMA), and a mixture of polycarbonate and acrylonitrile-butadiene-styrene plastics (PC+ABS). The substrate 11 may instead be made of glass or ceramic.

The base paint coating 13 may be formed by spraying acrylic resin paint, and can be transparent. The base paint coating 13 has a smooth surface for enhancing bonding between the base paint coating 13 and subsequent coatings. The base paint coating 13 has a thickness of about 1-30 μm.

The metallic-appearing coating 15 may be a mono-coating of indium, tin, zinc, aluminum, titanium dioxide, niobium oxide, zirconium oxide, aluminum oxide, or tantalum oxide. Alternatively, the metallic-appearing coating 15 may be a composite of silicon dioxide and other metallic-appearing oxides, such as niobium oxide, zirconium oxide, or tantalum oxide. The thickness of the metallic-appearing coating 15 may be in a range of about 20-2000 nm. The thickness of the metallic-appearing coating 15 is determined by balancing the requirement for presenting a metallic-appearance without interfering with radio transmission capabilities, and may be formed by vacuum sputtering or vacuum vapor deposition.

The intermediate paint coating 17 may be a transparent ultraviolet (UV) curable paint coating with a thickness of about 1-10 μm, protecting the metallic-appearing coating 15 from abrasion.

The top coating 19 is formed on the intermediate paint coating 17 by painting. The paint component for the top coating 19 may be acrylic resin paint, epoxy resin paint, polyurethane resin paint, or phenolic resin paint. Further, the paint contains nano-titanium dioxide powder in a mass percentage of about 1-5%, fluorocarbon resin in a mass percentage of about 10-75%, and nano-silicon dioxide powder in a mass percentage of about 0.25-1.25%. The mass ratio between the fluorocarbon resin and the nano-titanium dioxide powder may be about 10:1 to about 15:1. The nano-titanium dioxide powder may have an average particle size of less than 100 nm. The nano-silicon dioxide powder contained in the top coating 19 may be used as a coupling agent to enhance the bonding between the top coating 19 and the intermediate paint coating 17.

The top coating 19 may be transparent or translucent, with a thickness of about 2-20 μm. The top coating 19 has self-cleaning properties. Specifically, when illuminated by visible light or ultraviolet light, the nano-titanium dioxide contained in the top coating 19 can oxygenize and repel dust and sweat that have accumulated on the surface thereof. Furthermore, the fluorocarbon resin contained in the top coating 19 greatly reduces the surface tension of the top coating 19, such that the top coating 19 resists fingerprint marks.

The base paint coating 13 is used as a bonding agent between the metallic-appearing coating 15 and the substrate 11. Alternatively, the base paint coating 13 may be omitted to directly apply the metallic-appearing coating 15 on the substrate 11.

It is to be understood that the intermediate paint coating 17 may be omitted, and the top coating 19 directly formed on the metallic-appearing coating 15.

It should be understood, however, that though numerous characteristics and advantages of the present embodiments have been set forth in the foregoing description, together with details of functions of the embodiments, the disclosure is illustrative only, and changes may be made in detail within the principles of the disclosure to the full extent indicated by the broad general meaning of the terms in which the appended claims are expressed.

What is claimed is:
1. An electronic device housing, comprising:
a substrate;
a metallic-appearing coating formed on the substrate; and
a top coating formed on the metallic-appearing coating;
wherein the top coating contains nano-titanium dioxide powder and fluorocarbon resin.

2. The electronic device housing as claimed in claim 1, wherein the nano-titanium dioxide powder has an average particle size of less than 100 nm.

3. The electronic device housing as claimed in claim 1, wherein the fluorocarbon resin and the nano-titanium dioxide powder has a mass ratio of about 10:1 to about 15:1.

4. The electronic device housing as claimed in claim 1, wherein the top coating further contains nano-silicon dioxide powder and a paint component.

5. The electronic device housing as claimed in claim 4, wherein the paint component contains acrylic resin, epoxy resin, polyurethane resin, or phenolic resin.

6. The electronic device housing as claimed in claim 1, wherein the nano-titanium dioxide powder has a mass percentage of about 1-5% of the top coating.

7. The electronic device housing as claimed in claim 1, wherein the top coating includes the fluorocarbon resin having a mass percentage of about 10-75%.

8. The electronic device housing as claimed in claim 4, wherein the top coating includes the nano-silicon dioxide powder having a mass percentage of about 0.25-1.25%.

9. The electronic device housing as claimed in claim 1, wherein the top coating has a thickness of about 2-20 μm.

10. The electronic device housing as claimed in claim 1, wherein the metallic-appearing coating is formed by vacuum sputtering or vacuum vapor deposition.

11. The electronic device housing as claimed in claim 1, wherein the metallic-appearing coating is a mono-coating of indium, tin, zinc, aluminum, titanium dioxide, niobium oxide, zirconium oxide, aluminum oxide, or tantalum oxide.

12. The electronic device housing as claimed in claim 1, wherein the metallic-appearing coating is a composite of silicon dioxide and other metallic-appearing oxides, the other metallic-appearing oxide is one selected from a group consisting of niobium oxide, zirconium oxide, and tantalum oxide.

13. The electronic device housing as claimed in claim 1, wherein the metallic-appearing coating has a thickness of about 20-2000 nm.

14. The electronic device housing as claimed in claim 1, further comprising a base paint coating formed between the metallic-appearing coating and the substrate.

15. The electronic device housing as claimed in claim 14, wherein the base paint coating is an acrylic resin paint coating having a thickness of about 1-30 μm.

16. The electronic device housing as claimed in claim 1, further comprising an intermediate paint coating formed between the metallic-appearing coating and the top coating.

17. The electronic device housing as claimed in claim 16, wherein the intermediate paint coating is a transparent ultraviolet curable paint coating having a thickness of about 1-10 μm.

18. The electronic device housing as claimed in claim 1, wherein the substrate is made of plastic, glass, or ceramic.

* * * * *